(12) United States Patent
Wang et al.

(10) Patent No.: US 11,184,408 B2
(45) Date of Patent: Nov. 23, 2021

(54) VOICE CALLING WITH A CONNECTED DEVICE

(71) Applicant: GOOGLE LLC, Mountain View, CA (US)

(72) Inventors: Jeffrey Ching Wang, San Francisco, CA (US); Chien-Jung Kung, Los Alton, CA (US); Madhusudhan R. Adupala, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/788,956

(22) Filed: Feb. 12, 2020

(65) Prior Publication Data
US 2021/0227000 A1    Jul. 22, 2021

Related U.S. Application Data

(60) Provisional application No. 62/962,868, filed on Jan. 17, 2020.

(51) Int. Cl.
| G06F 16/957 | (2019.01) |
| H04L 29/06 | (2006.01) |
| H04L 29/08 | (2006.01) |
| G10L 15/30 | (2013.01) |
| G06F 9/455 | (2018.01) |
| G10L 15/22 | (2006.01) |

(52) U.S. Cl.
CPC ...... *H04L 65/1006* (2013.01); *G06F 9/45529* (2013.01); *G10L 15/22* (2013.01); *G10L 15/30* (2013.01); *H04L 65/1069* (2013.01); *H04L 65/608* (2013.01); *H04L 67/02* (2013.01); *G10L 2015/223* (2013.01); *H04L 67/10* (2013.01)

(58) Field of Classification Search
CPC . H04L 65/1006; H04L 65/1069; H04L 67/02; H04L 65/608; H04L 67/10; G10L 15/22; G10L 15/30; G10L 2015/223; G06F 9/45529
See application file for complete search history.

(56) References Cited

U.S. PATENT DOCUMENTS

2018/0338026 A1* 11/2018 Jon ..................... H04L 65/80
2019/0155861 A1* 5/2019 Klug .................. G06F 9/5072

* cited by examiner

*Primary Examiner* — Kim T Nguyen
(74) *Attorney, Agent, or Firm* — Butzel

(57) ABSTRACT

Systems and techniques are provided for voice calling with a connected device that does not include a SIM card or telephone port. Outgoing audio data may be received at an embedded browser running on a connected device, may be sent using Web Real Time Communications (WebRTC) from the embedded browser to an integration layer panning within the embedded browser, and may be sent from the integration layer to a border controller for a voice call carrier over a Session Initiation Protocol (SIP) connection according to Secure Real Time Transport Protocol (SRTP). Incoming audio data may be received at the integration layer from the border controller for the voice call carrier over the SIP connection according to SRTP, may be sent using WebRTC from the integration layer to the embedded browser, and may be sent from the embedded browser to an audio output of the connected device which may output audio.

20 Claims, 13 Drawing Sheets

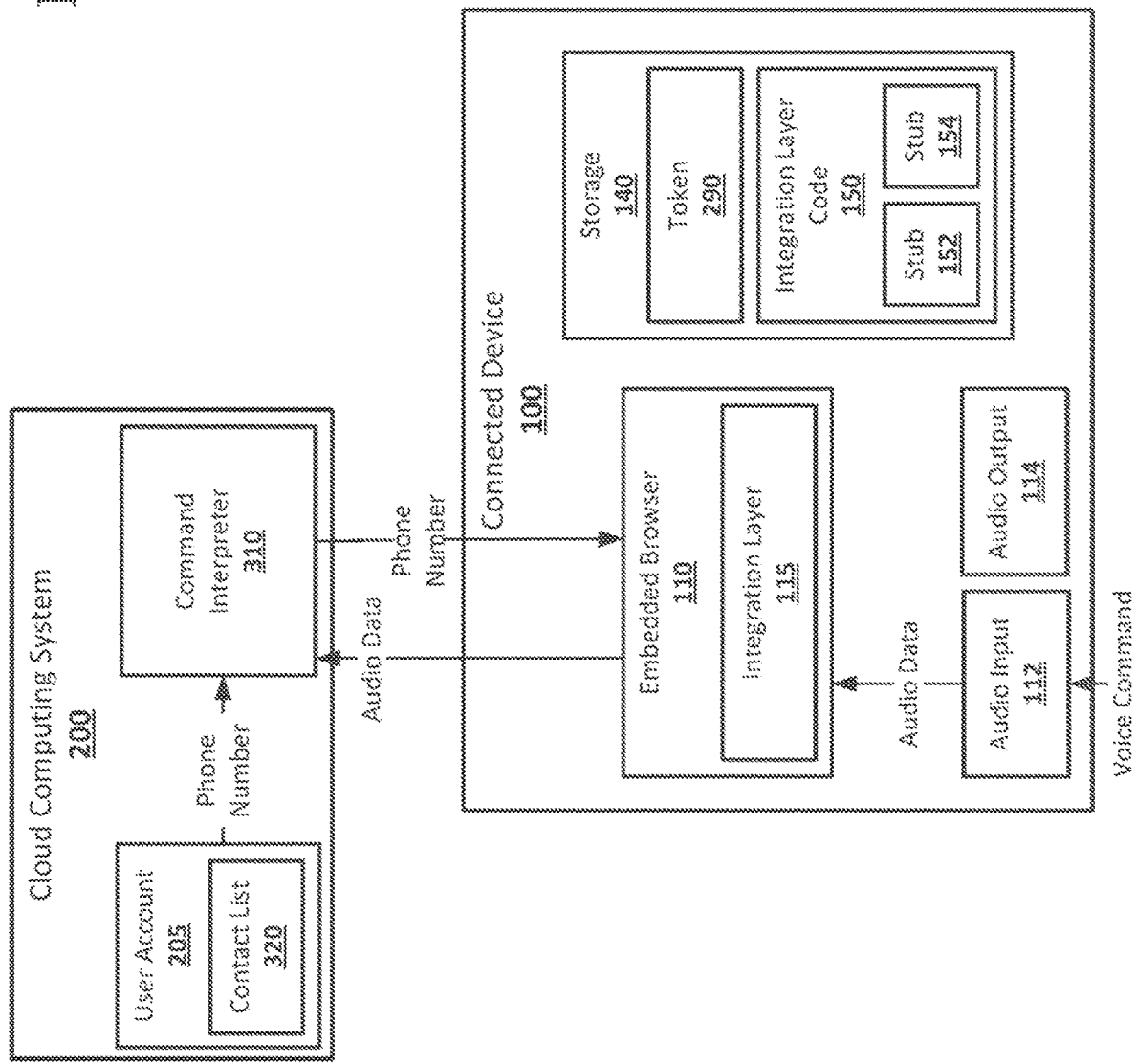

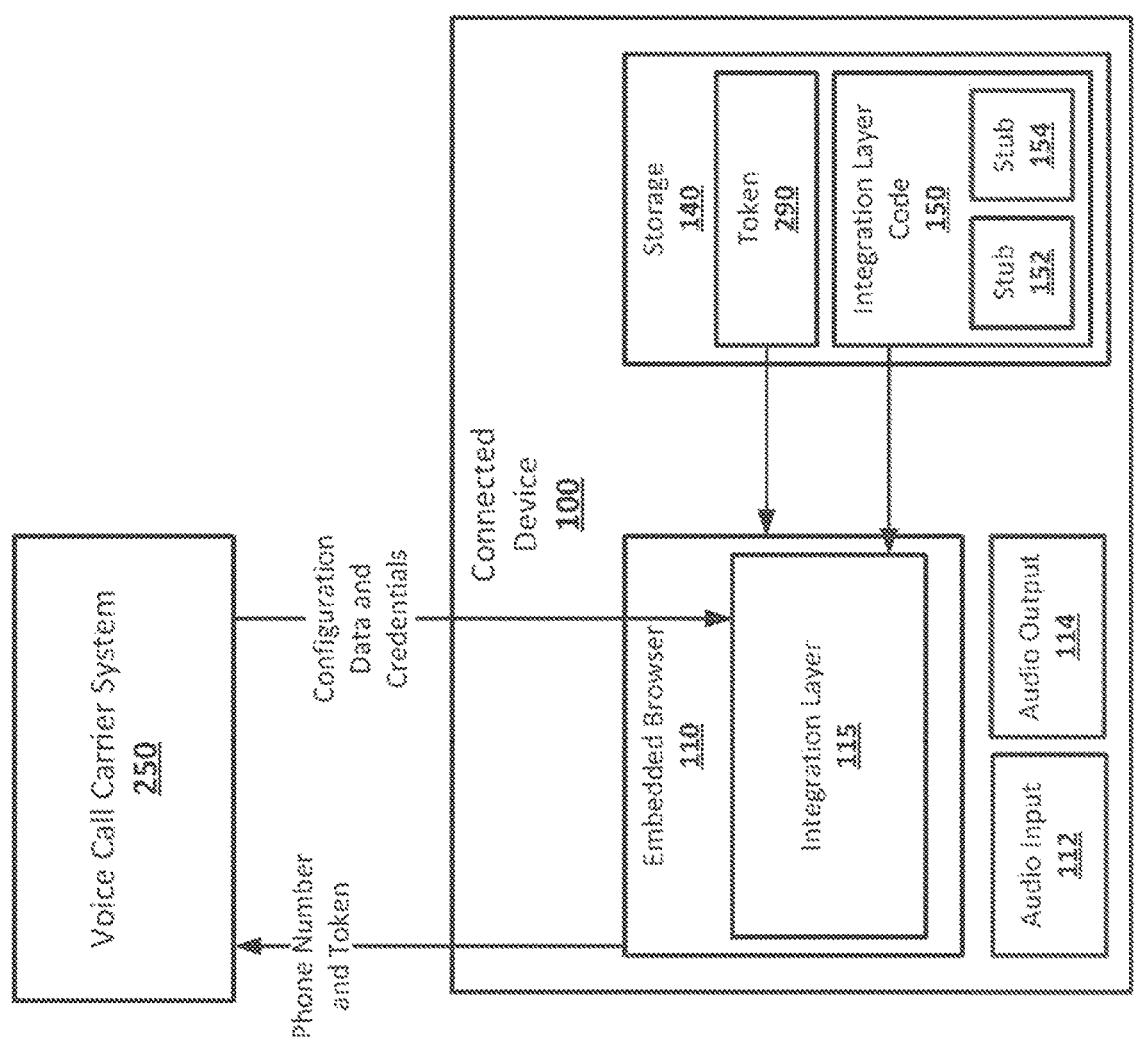

VOICE CALLING WITH A CONNECTED DEVICE

BACKGROUND

Connected devices, such as displays and speakers that include computing and network hardware, may not include subscriber identification module (SIM) card slots or appropriate ports to connect to the land-line phone network. This may make it difficult to use such a connected device to place a voice call through the systems of a voice call carrier, such as a cellular service provider.

BRIEF SUMMARY

According to an embodiment of the disclosed subject matter, outgoing audio data may be received from an audio input of a connected device at an embedded browser running on the connected device. The outgoing audio data may be sent from the embedded browser to an integration layer running within the embedded browser. The outgoing audio data may be sent using Web Real Time Communications (WebRTC) The outgoing audio data may be sent from the integration layer to a border controller for a voice call carrier over a Session Initiation Protocol (SIP) connection. The outgoing audio data may be sent according to Secure Real Time Transport Protocol (SRTP). Incoming audio data may be received at the integration layer from the border controller for the voice call carrier over the SIP connection, wherein the incoming audio data is received according to SRTP The incoming audio data may be sent from the integration layer to the embedded browser. The incoming audio data may be sent using WebRTC. The incoming audio data may be sent from the embedded browser to an audio output of the connected device. The audio output of the connected device may output audio based on the incoming audio data.

The SIP connection may be established by sending, to a voice call carrier system, a private token and a phone number of a specified party, where the private token is associated with a user account on the voice call carrier system, receiving, from the voice call carrier system, configuration data and credentials, where the configuration data may include the phone number of the specified party, and sending, to the voice call carrier border controller, the configuration data and credentials.

The private token may be obtained from the voice call carrier system based on sending the voice call carrier system credentials for a cloud computing account and a phone number associated with the user account on the voice call carrier system and sending a verification code sent by the voice call carrier system to a telephonic device using the phone number associated with the user account on the voice call carrier system to the voice call carrier system.

The private token may be received from the voice call carrier system or a cloud computing system that includes the cloud competing account. The private token may be stored.

Audio for a voice command to place a call may be received at the audio input and may be converted to audio data for the voice command to place a call. The audio data for the voice command to place a call may be sent to a cloud computing system including a user account associated with the connected device. A phone number for a specified party in the audio data for the voice command to place a call may be received from the cloud computing system.

The embedded browser may be written in C++ and the integration layer may be written in JavaScript.

Feature code for a feature, where the feature is associated with phone calling, may be received at the connected device from the cloud computing system or the voice call carrier system.

The feature code may be stored in a stub of the integration layer. The stub may be associated with the feature.

The feature code may be written in the same programming language as the integration layer and may include a star code associated with systems of the voice call carrier.

Audio for a voice command invoking the feature may be received at the audio input and convened to audio data for the voice command invoking the feature. The audio data for the voice command invoking the feature may be sent to a cloud computing system including a user account associated with the connected device. An indication of the feature in the audio data for the voice command invoking the feature may be received from the cloud computing system Feature code for the feature from the stub in the integration layer may be am in the embedded browser. An item of data for the feature may be sent from the integration layer to the voice call carrier border controller based on the running of the feature code.

The connected device may be a smart speaker or a smart display.

According to an embodiment of the disclosed subject matter, a means for receiving outgoing audio data from an audio input of a connected device at an embedded browser running on the connected device, a means for sending the outgoing audio data from the embedded browser to an integration layer running within the embedded browser, wherein the outgoing audio data is sent using Web Real Time Communications (WebRTC) is included. A means for sending the outgoing audio data from the integration layer to a border controller for a voice call carrier over a Session Initiation Protocol (SIP) connection, wherein the outgoing audio data is sent according to Secure Real Time Transport Protocol (SRTP) is included. A means for receiving incoming audio data at the integration layer from the border controller for the voice call carrier over the SIP connection, wherein the incoming audio data is received according to SRTP is included. A means for sending the incoming audio data from the integration layer to the embedded browser, wherein the incoming audio data is sent using WebRTC is included. A means for sending the incoming audio data from the embedded browser to an audio output of the connected device is included. A means for outputting, by the audio output of the connected device, audio based on the incoming audio data is included. A means for sending, to a voice call carrier system, a private token and a phone number of a specified party, wherein the private token is associated with a user account on the voice call carrier system is included. A means for receiving, from the voice call carrier system, configuration data and credentials, wherein the configuration data may include the phone number of the specified party is included. A means for sending, to the voice call carrier border controller, the configuration data and credentials is included. A means for receiving the private token from the voice call carrier system or a cloud computing system that includes the cloud competing account is included. A means for storing the private token is included. A means for receiving, at the audio input, audio for a voice command to place a call and converting the audio to audio data for the voice command to place a call is included. A means for sending the audio data for the voice command to place a call to a cloud computing system including a user account associated with the connected device is included. A means for receiving a phone number for a specified party in the audio data for the voice command to place a call from the cloud computing system, a means for receiving, at the connected device from the cloud computing system or the voice call carrier system, feature code for a feature, wherein the feature is associated with phone calling is included. A means for storing the feature code in a stub of the integration layer, wherein the stub is associated with the feature, a means for receiving, at the audio input, audio for a voice command invoking the feature and converting the audio to audio data for the voice command invoking the feature is included. A means for sending the audio data for the voice command invoking the feature to a cloud computing system including a user account associated with the connected device in included. A means for receiving an indication of the feature in the audio data for the voice command invoking the feature from the cloud computing system, a means for running, in the embedded browser, feature code for the feature from the stub in the integration layer is included A means tor sending, from the integration layer, at least one item of data for the feature to the voice call carrier border controller based on the running of the feature code, is included.

Additional features, advantages, and embodiments of the disclosed subject matter may be set forth or apparent from a consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows an example arrangement suitable for voice calling with a connected device according to an implementation of the disclosed subject matter.

FIG. 4 shows an example arrangement suitable for voice calling with a connected device according to an implementation of the disclosed subject matter.

DETAILED DESCRIPTION

Figure 1:
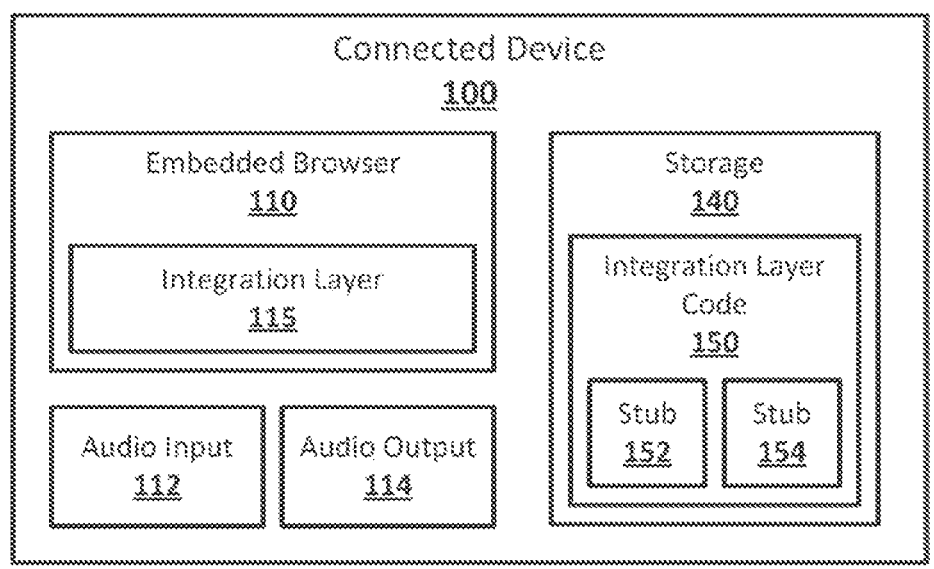
FIG. 1 shows an example system suitable for voice calling with a connected device according to an implementation of the disclosed subject matter.

According to embodiments disclosed herein, voice calling with a connected device may allow for connected devices to place and receive calls using a user's voice call carrier. A connected device may run an embedded browser that may handle low-level protocols. The embedded browser may be written in a low-level programming language and compiled to run on the connected device. An integration layer written in a higher-level programing language may run within the embedded browser. The integration layer may handle protocols to allow the connected device to interface with systems used by voice call carriers. The integration layer may be customizable per voice call carrier. The connected device may also interface with a cloud computing system that may be include a cloud computing account belonging to the user. To place a voice call, a user may use a voice command to indicate the party they wish to call. The connected device may send the audio from the voice command to the cloud computing system, which may determine the appropriate phone number to use from the user's cloud computing account. The connected device may then interface with the system of a voice call carrier to place the call using the user s account with voice call carrier. Audio data from the party that receives the call may be routed from the systems of the voice call carrier to the connected device, and audio data from the connected device may route to the party that receives the call through the systems of the voice call carrier.

A connected device may run an embedded browser that may handle low-level protocols. Connected devices may be electric or electronic devices, such as speakers or displays, that may include computing and networking hardware that may allow the connected devices to interact with other connected devices and electronics and general-purpose computing devices. Connected devices may generally have more limited computational resources than general purpose computing devices. Connected devices may not include SIM card slots and therefore not use SIM cards, may not include embedded-SIM (eSIM) electronics, and may not include registered jack-11 (RJ-11) ports or other such telephone ports, and thus may not connect directly to voice call carriers through the cellular or telephone networks in order to place a voice call. The embedded browser may be written in a low-level programming language and compiled to run on the connected device. An integration layer written in higher-level programing language may run within the embedded browser. The connected device may be any suitable computing device, such as, for example, a smart display or smart speaker. The connected device may run an embedded browser that may be written using a low-level programming language, for example, C++ and compiled to run on the connected device. The embedded web browser may handle low-level protocols for allowing the connected device to interact with other computing devices and control the input and output of the connected device through networking interfaces and human interaction devices of the connected device.

An integration layer may be written in a higher-level programming language and may run within the embedded browser, for example, the integration layer may be written in JavaScript which may run in the embedded web browser of the connected device. The integration layer may control communication using higher-level protocols, for example, between a cloud computing system, the connected device, and the system of a voice call carrier through a networking interface of the connected device. The voice call carrier may be any suitable carrier for voice calls, including cellular voice carriers and land-line voice carriers. The system of the voice call carrier may be a server system that is independent from the cloud computing system. The integration layer may allow the embedded browser to interoperate with the system of the voice call carrier. For example, the integration layer may be in the middle of communication between the embedded web browser of the connected device, which may use Web Real-Time Communications (WebRTC), and the system of a voice call carrier that may use Session Initiation Protocol (STP) and Secure Real-Time Transport Protocol (SRTP). The integration layer may, for example, receive data, such as audio data, generated by the embedded browser and transmitted using WebRTC, and transmit the data to the system of a voice call carrier using SIP and STRP. The integration layer may similarly receive data, such as audio data, sent from the system of a voice call carrier using SIP and STRP and communicate the data to the embedded browser of the connected device using WebRTC. The integration layer may thus allow audio data to be sent between the embedded browser of the connected device and the system of a voice call carrier. The integration layer may be compatible with any voice call carrier with a system that uses SIP, STRP, or any other protocol implemented in the integration layer, without requiring the low-level code of the connected device be updated to allow integration with each voice call carrier.

A user of the connected device may have an account in a cloud computing system and an account with a voice call carrier. A user may link their account in the cloud computing system to their account with the voice call carrier. For example, the user may use credentials, such as a username and password, for their cloud computing account to login to the system of the voice call carrier. The credentials may be sent directly to the cloud computing system, which may verify the credentials before allowing the user to login to the system of the voice call carrier by sending a token, such as OAuth token, that allows access to specific parts of the user's account on the cloud computing system to the system of the voice call carrier. After the user is logged in to the voice call carrier using credentials for the user's account on the cloud computing system, the user may enter their phone number into the system of the voice call carrier. The system of the voice call carrier may verify that the phone number is associated with an account on the system of the voice call carrier If the phone number is determined to be associated with an account on the system of the voice call carrier, the system of the voice call carrier may send a verification code to the phone number, for example, via text messaging protocol such as SMS, or via voice message. The user may receive the verification code on a device associated with their phone number, such as a smartphone or land-line phone, and enter the verification code into the system of the voice call carrier. The system of the voice call carrier may verify that the code entered by the user to determine whether the correct verification code was entered. When the user enters the correct verification code, the system of the voice call carrier may generate a private token, such as, for example, a private OAuth2 token. The private token may be stored on the user's connected device, and may also be stored as part of the user's account in the cloud computing system, where it may be retrieved by other connected devices that the user's permits to access their cloud computing system account. The private token may be usable to verify requests to API's of the system of the voice call carrier using the user's account with the voice call carrier that includes the phone number that received the verification code.

A user may initiate a call using the connected device. The user may, for example, use voice commands to request that the connected device place a call to a specified party. The connected device may include a built-in microphone, or may be connected to an external microphone through any suitable wired or wireless connection, such as, for example, through a Bluetooth connection. The connected device may be logged into the user's cloud computing system account, and may upload audio data generated by recording the voice command to the cloud computing system. The cloud computing system may analyze the audio data to determine the specified party in the voice command that the user wishes to call, and may access the user's contact list stored in the cloud computing system account to determine the phone number to use to reach the specified party. The cloud computing system may determine which contact in the user's contact list best matches the specified partly from the voice command, for example, using a machine learning system or other business logic. For example, if the voice command from the user is "call mom", the cloud computing system may determine which contact in the user's contact list best corresponds to "mom." The cloud computing system may retrieve the phone number from the contact in the user's contact list determined to best correspond to the specified party in the voice command. In some implementations, the cloud computing system may retrieve the phone number from sources other than the user's contact list. For example, the cloud computing system may reference a database that includes business, organization, and other non-personal phone numbers when the specified party is a business, organization, or other such entity. The cloud computing system may send the retrieved phone number back to the connected device. The embedded browser may handle communications between the connected device and the cloud computing system through any suitable networking interface of the connected device, such as, for example, a WiFi or Ethernet network interface.

The connected device may interface with the system of a voice call carrier to place the call using the user's account with the voice call carrier. The connected device may send the phone number of the specified party, as determined by the cloud computing system, and the private token to a configuration API of the system of the voice call carrier. The system of the voice call carrier may verify the private token, and upon successful verification, send configuration data and credentials, for example, SIP credentials, back to the connected device. The integration layer running on the connected device may receive the configuration data and credentials and may use them to establish a connection with a border controller of the system of the voice call carrier, for example, using SIP, and cause the system of the voice call carrier to place a call to the phone number of the specified party. The configuration data and credentials may be linked to the user's account with the voice call carrier so that, for example, the connected device may cause the system of a cellular voice call carrier to initiate the call without the connected device needing a SIM card connected to the user's account with the voice call carrier. The border controller may be, for example, a Session Border Conntroller/Proxy Call Session Control Function (SBC/PCSCF) device. The voice call carrier may place the call to phone number for the specified party over the publicly switched telephone network, causing ringing at both the connected device and device reached at the specified phone number, for example, cellular phone, wired or wireless Voice-over-IP phone, landline phone, or other connected device, while waiting for the call to be accepted at the device reached at the phone number of the specified party.

When the call is accepted at the device reached at the phone number of the specified party, a call may be connected between the connected device and the device reached at the phone number of the specified party. Audio data may be generated from audio recorded by a microphone built-in to or connected to the connected device. The recording of the audio data may be handled by the embedded browser, which may generate an audio stream of outgoing audio using WebRTC. The audio stream of outgoing audio may be received at the integration layer. The integration layer may convert the audio data into proper formal for transmission according to the transmission protocol used by the system of the voice call carrier, such as, for example, SRTP. The audio data, as converted by the integration layer, may be transmitted to the border controller of the system of the voice call carrier, for example, by the embedded browser over the Internet using any suitable network interface of the connected device. The system of the voice call carrier may route the audio data to the device that accepted the call in any suitable manner. Audio data generated by the device that accepted the call may be transmitted from that device to the system of the voice call carrier in any suitable manner, for example, using any suitable combination of data connections, connections over the publicly switched telephone network, and connections over cellular networks. The border controller of the system of the voice call carrier may transmit the audio data according to its transmission protocol, for example, SRTP, to the connected device. The audio data may be received at the integration layer of the connected device. The integration layer may convert the audio data into an audio stream of incoming audio using WebRTC. The audio stream of incoming audio may be received at the embedded browser, which may output the audio stream of incoming audio over a speaker built-in to, or otherwise connected to, the connected device, effecting playback of the audio received from the device that accepted the call.

The integration layer may include stubs that may be used to allow for custom implementation of additional features by a voice call carrier. Different voice call carriers may use different star codes to implement various features associated with phone calling, such as three-way calling and call transfers. To implement these features, a voice call carrier may prepare their own code using the same programming language as the integration layer, such as, for example, JavaScript. The voice call carrier's axle for a feature may be transmitted to the connected device from the system of the voice call carrier or the cloud computing system, and may be added to the appropriate stub in the integration layer. For example, code to implement call transfer may be added to a stub in the integration layer for call transfer. The stubs may already include code that may be common to the implementation of a feature across voice call carriers. The code added to the stub by the voice call carrier may then be usable by the integration layer to implement the feature on the connected device, for example, based on voice commands from a user. For example, a voice command to transfer a call may result in the integration layer running the code added to the integration layer stub, which may transmit the appropriate star code and the phone number that is the target of the transfer to the border controller of the system of the voice call carrier, which may then implement the call transfer in the same manner as it would if the star code was received from any other phone. A voice call carrier may be able to update and change code added to stubs in the integration layer at any time. If the user changes which voice call carrier is used by the connected device from an old voice call carrier to a new voice call carrier, the new voice call carrier may update any of the stubs in the integration layer with its own code, replacing any code from the old voice call carrier.

FIG. 1 shows an example system suitable for voice calling with a connected device according to an implementation of the disclosed subject matter. A connected device 100 may include an embedded browser 110 with an integration layer 115, an audio input 112, an audio output 114, and storage 140. The connected device 100 may be any suitable connected device that may include components similar to a computer 20 as described in FIG. 14, for implementing the embedded browser 110, audio input 112, and audio output 114, mid the storage 140. The connected device 100 may be, for example, a speaker, television, or display that may include computing and networking hardware, but may not include hardware used for directly placing voice calls with voice call carriers, such as a SIM card, SIM card slot, eSIM, or RJ-11 port. The embedded browser 110 may be a web browser that may run on the connected device and may be written using a low-level programming language. The audio input 112 may be any suitable hardware and software for receiving audio input. The audio output 114 may be any suitable hardware and software for outputting audio. The storage 140 may be any suitable combination of hardware and software for implementing non-volatile and volatile storage, and may store the integration layer code 150.

The connected device 100 may include an embedded browser 110. The embedded browser 110 may be, for example, a web browser written in a low-level programming language, such as C++, and compiled to run on a processor of the connected device 100. The embedded browser 110 may handle low-level protocols and input and output of the connected device 100. For example, the embedded browser may implement the WebRTC protocol, may control data sent to and received by a networking interface, such as an Ethernet or a WiFi interface, of the connected device 100, may control reading and writing of data from and to the storage 140, and may handle audio received at the audio input 112 and send audio data to the audio output 114.

The integration layer 115 may run in the embedded browser 110. Code for the integration layer 115 may be written using a higher-level programming language than that used to write the embedded browser 110 and stored in the storage 140 as integration layer code 150. The integration layer code 150 may be written in, for example, JavaScript. The integration layer code 150 may not be compiled before being stored in the storage 140, and may instead by compiled by a just-in-time compiler that is a component of the embedded browser 110 when the integration layer code 150 is used to implement, the integration layer 115 within the embedded browser 110. The integration layer 115 may handle high-level protocols, such as, for example, SIP and SRTP, and may be able to establish connections between the connected device 100 and other computing devices, such as the system of a voice call carrier, using SIP, encode data, such as outgoing audio data, for transmission to other computing devices according to SRTP, and decode data, such as incoming audio data, that is received according to SRTP from other computing devices.

The integration layer code 150 may include stubs, such as the stub 152 and the stub 154. The stubs may be placeholders for features that may be added to the integration layer code 150 by a voice call carrier through code provided by the voice call carrier. The features may be features associated with phone calling, such as call transfers and three-way calling. The stubs may include code related to the feature that the stub is a placeholder for, or may be empty. For example, the stub 152 may be a stub for a call transfer feature, and may include some code for implementing call transfer, and the stub 154 may be a stub for three-way calling. Code added to a stub by a voice call carrier may be called by other pans of the integration layer code 150 when the integration layer 115 is running, and may be compiled in the same manner as the integration layer code 150 to implement the feature of the stub. For example, the integration layer code 150 may include code that calls the stub 152 when the connected device has received a command to initiate a call transfer, resulting in code added to the stub 152 by the voice call carrier being compiled and run by the embedded browser 110 as part of the integration layer 115, implementing a call transfer. The code added to a stub by a voice call carrier may, for example, include star codes used by the voice call carrier to initiate the feature of the stub at the systems of the voice call carrier.

The audio input 112 may be any suitable combination of hardware and software of the connected device 100 for receiving audio. The audio input 112 may include, for example, a microphone built-in to the connected device 100 and an analog-to-digital converter to convert a signal from the microphone to digital audio data. The audio input 112 may include an input for an external microphone that may be plugged in to the connected device 100 using a cable, or may be connected to the connected device 100 wirelessly, for example, using Bluetooth or any other suitable wireless protocol.

The audio output 114 may be any suitable combination of hardware and software of the connected device 100 for transmitting audio. The audio output 114 may include, for example, a speaker built-in to the connected device 100 and a digital-to-analog converter to convert digital audio from the embedded browser 110 to audible sound. The audio output 114 may include an output for an external speaker that may be plugged in to the connected device 100 using a cable, or may be connected to the connected device 100 wirelessly, for example, using Bluetooth or any other suitable wireless protocol.

The storage 140 may be any suitable storage hardware connected to the connected device 100. For example, the storage 140 may be a component of the connected device 100, such as a flash memory module or solid state disk, or may be connected to the connected device 100 through any suitable wired or wireless connection. The storage 140 may store the integration layer code 150, which may be the code, written in any suitable language, that may be run in the embedded browser 110 to implement the integration layer 115.

Figure 2A:
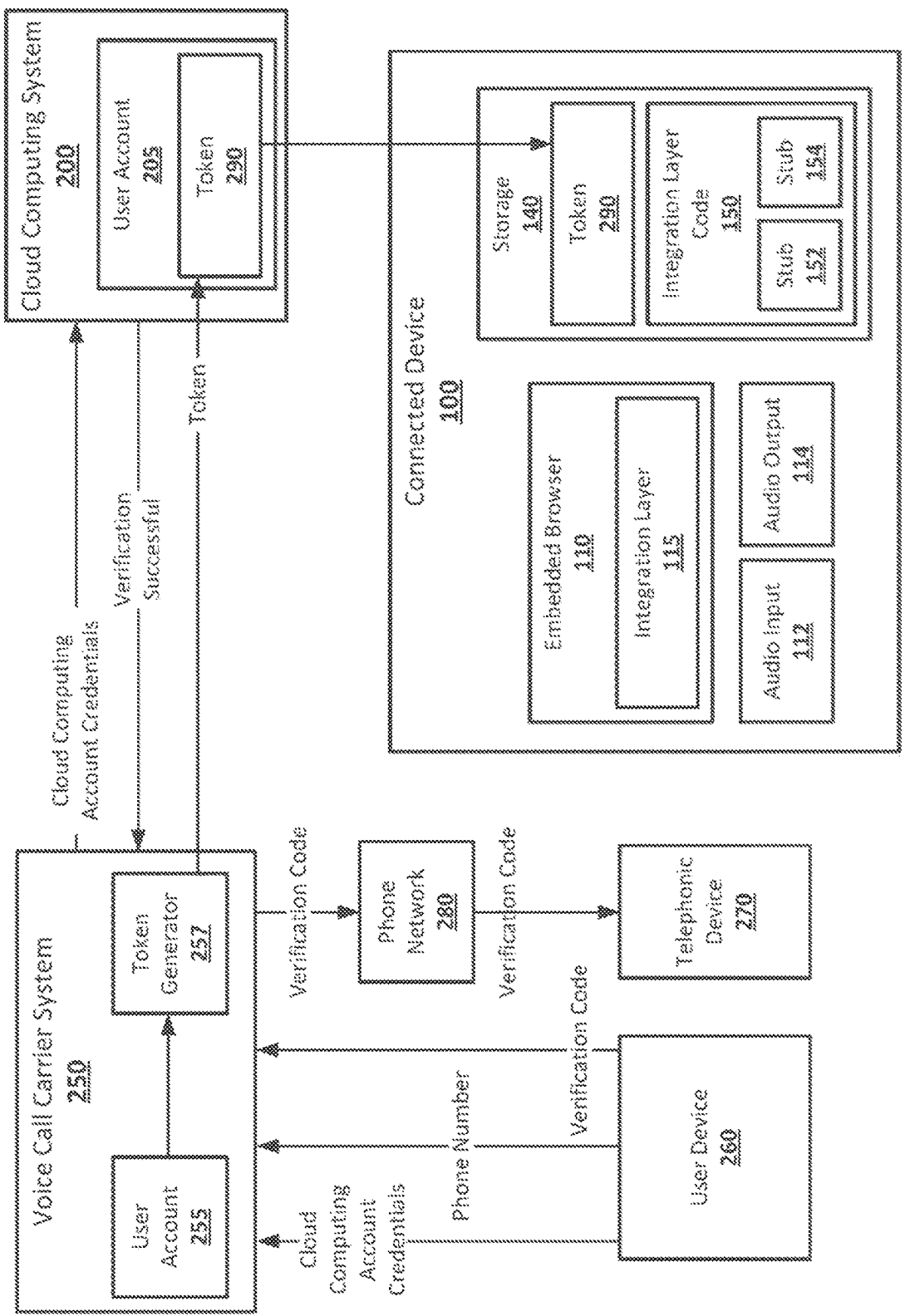
FIG. 2A shows an example arrangement suitable for voice calling with a connected device according to an implementation of the disclosed subject matter.

FIG. 2A shows an example arrangement suitable for voice calling with a connected device according to an implementation of the disclosed subject matter. A user computing device 260 may access a voice call carrier system 250, for example, through a web page of the voice call carrier system 250. The user computing device 260 may be any suitable computing device, such as, for example, a smartphone, tablet, laptop, or other such computing device. The voice call carrier system 250 may be the system, for example, server system, of a voice call carrier, such as, for example, a cellular service provider or land-line service provider, which may host a web page that may allow a user to sign-in to a user account 255 that the user may have with the voice call carrier.

The user computing device 260 may send cloud computing account credentials to a cloud computing system 200 through the voice call carrier system 250. The user of the user computing device 260 may, for example, have a user account 205 with a cloud computing system 200, and may enter the cloud computing account credentials on a web page hosted on the voice call carrier system 250 and accessed with the user computing device 260. The web page may include, for example, a login screen for the cloud computing system 200, which may accept the entry of a username and password that may be sent directly to the cloud computing system 200 through the web page, such that the voice call carrier system 250 does not itself receive the credentials. The credentials may also be, for example, a token, such as an OAuth token, for the cloud computing system 200. The cloud computing system 200 may be any suitable cloud computing system, for example, server system, that may provide cloud computing services accessed through accounts with the cloud computing system 200. The cloud computing account credentials may be transmitted, for example, through the Internet, to the cloud computing credentials to the cloud computing system 200 for verification. The cloud computing account credentials may be transmitted with an indication that they were submitted through the voice call carrier system 250, for example, from a login page for the voice call carrier system 250.

The cloud computing system 200, on successfully verifying the cloud computing account credentials, for example, determining that they are the correct credentials for the user account 205, may send an indication that the verification was successful back to the voice call carrier system 250. The verification may be, for example, a token, such as an OAuth token that may be used to access specified parts of the user's account on the cloud computing system 200. The voice can caret system 250 may then receive a phone number from the use computing device 260. For example, the web page accessed on the voice call carrier system 250 by the user computing device 260 may present an input text box requesting that the user of the user computing device 260 enter a phone number. Some implementations, the user computing device 260 may provide the phone number at the same time as the cloud computing account credentials. The voice, call carrier system 250 may verify that the phone number received from the user computing device 260 is associated with an account in the voice call carrier system 250, such as the user account 255.

The voice call carrier system 50 may send a verification code to a device reached at the phone number sent from the user computing device 260 to the voice call carrier system 250. The device reached at the phone number may be a telephonic device 270, which may be, for example, a cellular phone, such as a smartphone, or a land line phone. The verification code may be any suitable string of characters that may be sent through phone network 280, which may include the publicly switched telephone network, public land mobile networks, and any other suitable network for routing calls and SMS messages based on a phone number. The verification code may be sent as an SMS message if, for example, the telephonic device 270 is a cellular phone, or may be sent as voice cab if the telephonic device 270 is, for example, a land-line phone.

The user of the user computing device 260 may retrieve the verification code from the telephonic device 270 and enter it into the user computing device 200 to be sent back to the voice call carrier system 250. The voice call carrier system 250 may verify the verification code received from the user computing device 260 by ensuring that it matches the verification code sent to the telephonic device 270. This may ensure that the user of the user computing device 260 has access to the telephonic device 270 that is reached the phone number entered by the user and associated with the user account 255 on the voice cab carrier system 250.

When the verification code sent from the user computing device 260 has been successfully verified by the voice call carrier system 250, the voice call carrier system 250 may generate a private token. For example, the voice call carrier system 250 may include a token generator 257, which may be any suitable combination of hardware and software for generating tokens, such as, for example, OAuth tokens. The token generator 257 may generate a private token, for example, an OAuth token, using data from the uses account 255, such as, for example, the phone number associated with the user account 255. The private token may be usable to verify requests to API's of the voice call carrier system 250 using the user account 255.

The voice cab carrier system 250 may transmit the private token to the cloud computing system 200. For example, the voice call carrier system 250 may use the token received from the cloud computing system 200 to authorize storage of the token generated by the voice call carrier system 250 in the user's account on the cloud computing system 200. The token generated by the voice call carrier system 250 may be stored as the token 290 in the user account 205 on the cloud computing system 200. The connected device 100 may be signed-in to the user account 205 of the cloud computing system 200, and may receive the token 290 from the cloud computing system 200. The token 290 may be stored in the storage 140 on the connected device 100.

Figure 2B:
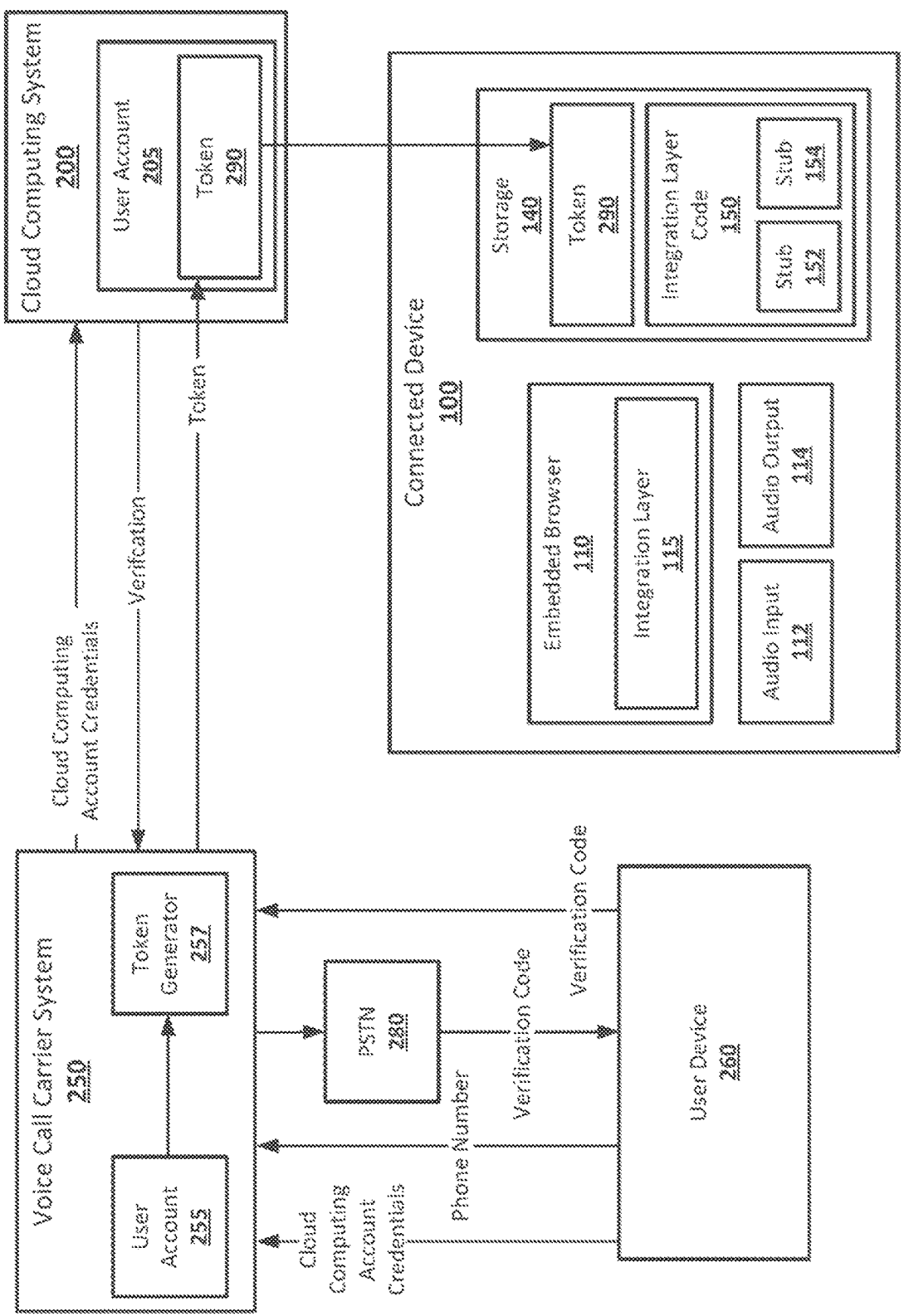
FIG. 2B shows an example arrangement suitable for voice calling with a connected device according to an implementation of the disclosed subject matter.

FIG. 2B shows an example arrangement suitable for voice calling with a connected device according to an implementation of the disclosed subject matter. In some implementations, the user computing device 260 may also be a telephonic device that may be reached at the phone number associated with the user account 255. For example, the user computing device 260 may be a smartphone, and the voice call carrier that operate the voice call carrier system 250 may be a cellular service provider that provides cellular voice and data services to the user computing device 260. The verification code sent by the voice call carrier system 250 may be sent to the user computing device 260, though the user of the user computing device 260 may still need to re-enter the verification code so that it may be sent back to the voice call carrier system 250. For example, the verification code may arrive at the user computing device 260 in an SMS message, and the user may then re-enter the verification code into an input box in a web browser running on the user computing device 260.

FIG. 3 shows an example arrangement suitable for voice calling with a connected device according to an implementation of the disclosed subject matter. A user may initiate a call to a specified party using the connected device 100. The user may, for example, use voice commands to request that the connected device 100 place a call to a specified party. The voice command may be received as audio at the audio input 112. The audio input 112 may convert the voice command to audio data, for example, digital audio data, that may be input to the embedded browser 110. The embedded browser 110 may transmit the audio data for the voice command to the cloud computing system 200. The connected device 100 may be logged-in to the user account 205 of cloud computing system 200, and the embedded browser 200 may send any necessary tokens or credentials for accessing the services of the cloud computing system 200 and the user account 205 to the cloud computing system 200 along with the audio data.

The cloud computing system 200 may include a command interpreter 310. The command interpreter 310 may be any suitable combination of hardware and software on the cloud computing system 200 that may analyze audio data to identify any commands included within the audio data, and may implement any identified commands. The command interpreter may, for example, include a machine learning system. The command interpreter 310 may analyze the audio data from the connected device 100, and may identify the command to call a specified party, and may access a contact list 320 stored in the user account 205 to determine the phone number to use to reach the specified party. The command interpreter 310 of the cloud computing system 200 may determine which contact in the contact list 320 best matches the specified party from the voice command. The command interpreter 310 of the cloud computing system 200 may retrieve the phone number from the contact in the contact list 320 determined to best correspond to the specified party in the voice command. The cloud computing system 200 may send the retrieved phone number of the specified patty from the contact list 320 back to the connected device 100, where it may be received by the embedded browser 110.

FIG. 4 shows an example arrangement suitable for voice calling with a connected device according to an implementation of the disclosed subject matter. The connected device 100 may send the phone number of the specified party received from the cloud computing system 200 and the token 290 from the storage 140 to the voice call carrier system 250. The voice call carrier system 250 may, for example, include a configuration API that may be used by the connected device 100. The voice call carrier system 250 may verify the token 290, and upon successful verification, send configuration data and credentials, for example, SIP credentials, back to the connected device 100. The configuration data and credentials may be passed to the integration layer 115, which may be implemented by running the integration layer axle 115 in the embedded browser 110. The configuration data and credentials may be for placing a call to the phone number of the specified party through the voice call carrier using the user account 255 of the user with the voice call carrier.

Figure 5:
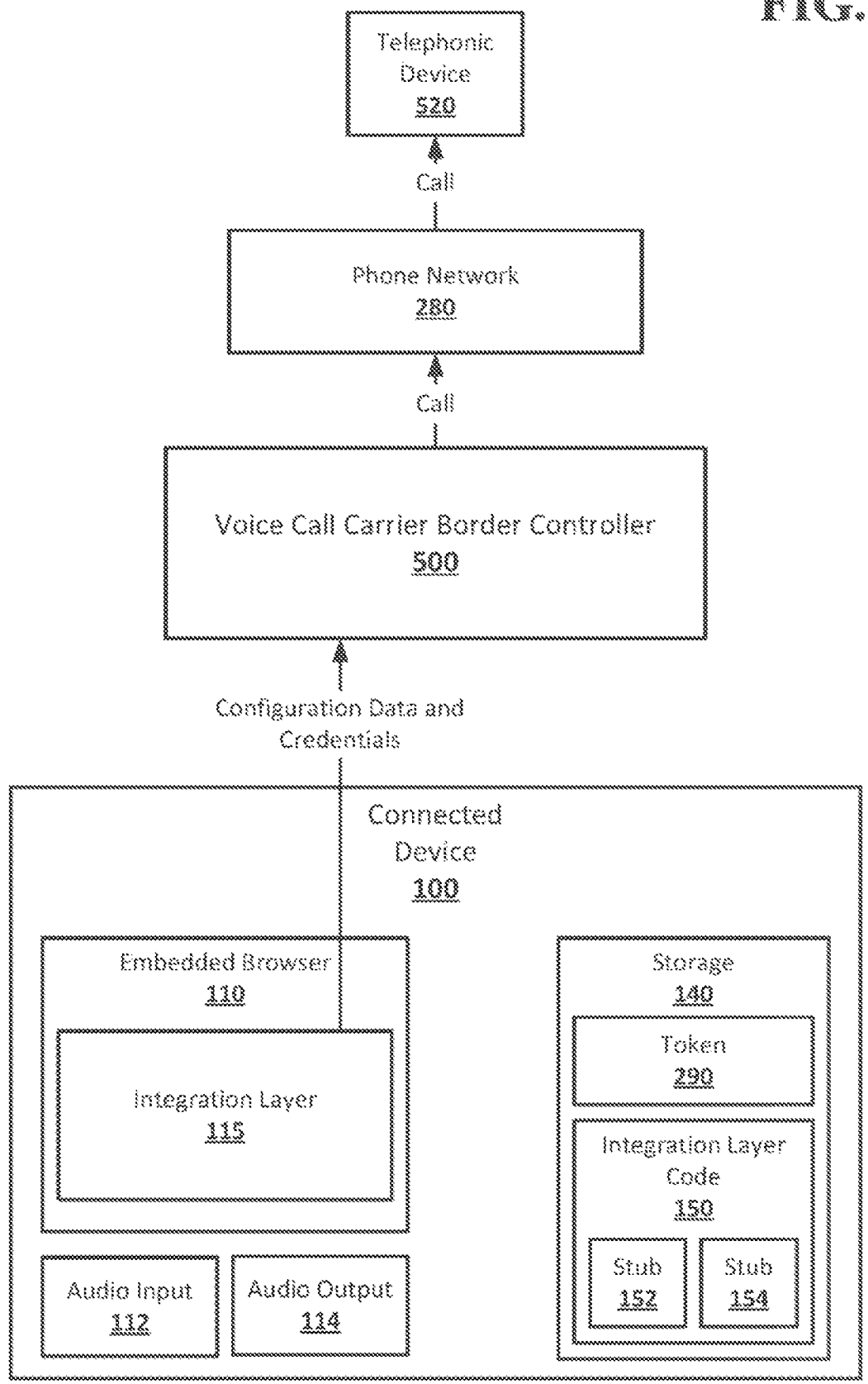
FIG. 5 shows an example arrangement suitable for voice calling with a connected device according to an implementation of the disclosed subject matter.

FIG. 5 show s an example arrangement suitable for voice calling with a connected device according to an implementation of the disclosed subject matter. The integration layer 115 may use the configuration data and credentials to establish a connection with a voice call carrier border controller 500. The voice call carrier border controller 500 may be a border controller computing device or system for the voice call carrier, and may control access to the systems of the voice call carrier used for routing calls through the phone network 280. The voice call carrier border controller 500 may be, for example, a Session Border Controller/Proxy Call Session Control Function (SBC/PCSCF) device. The connection between the connected device 100 and the voice all carrier border controller 500 may be established, for example, using SIP, and may cause the system of the voice call carrier to place a call to the phone number of the specified party. The configuration data and credentials may be linked to the user account 255 with the voice call carrier so that, for example, the connected device 100 may cause the system of a cellular voice call carrier to initiate the call without the connected device 100 needing a SIM card connected to the user account 255 with the voice call carrier. The voice call carrier may place the call to phone number for the specified party over the phone network 280, causing ringing at both the connected device 100 and a telephone device 520 reached at the specified phone number while waiting for the call to be accepted at the telephonic device 520. The telephonic device 520 reached at the specified phone number may be, for example, cellular phone, wired or wireless Voice-over-IP phone, land-line phone, or other connected device.

Figure 6:
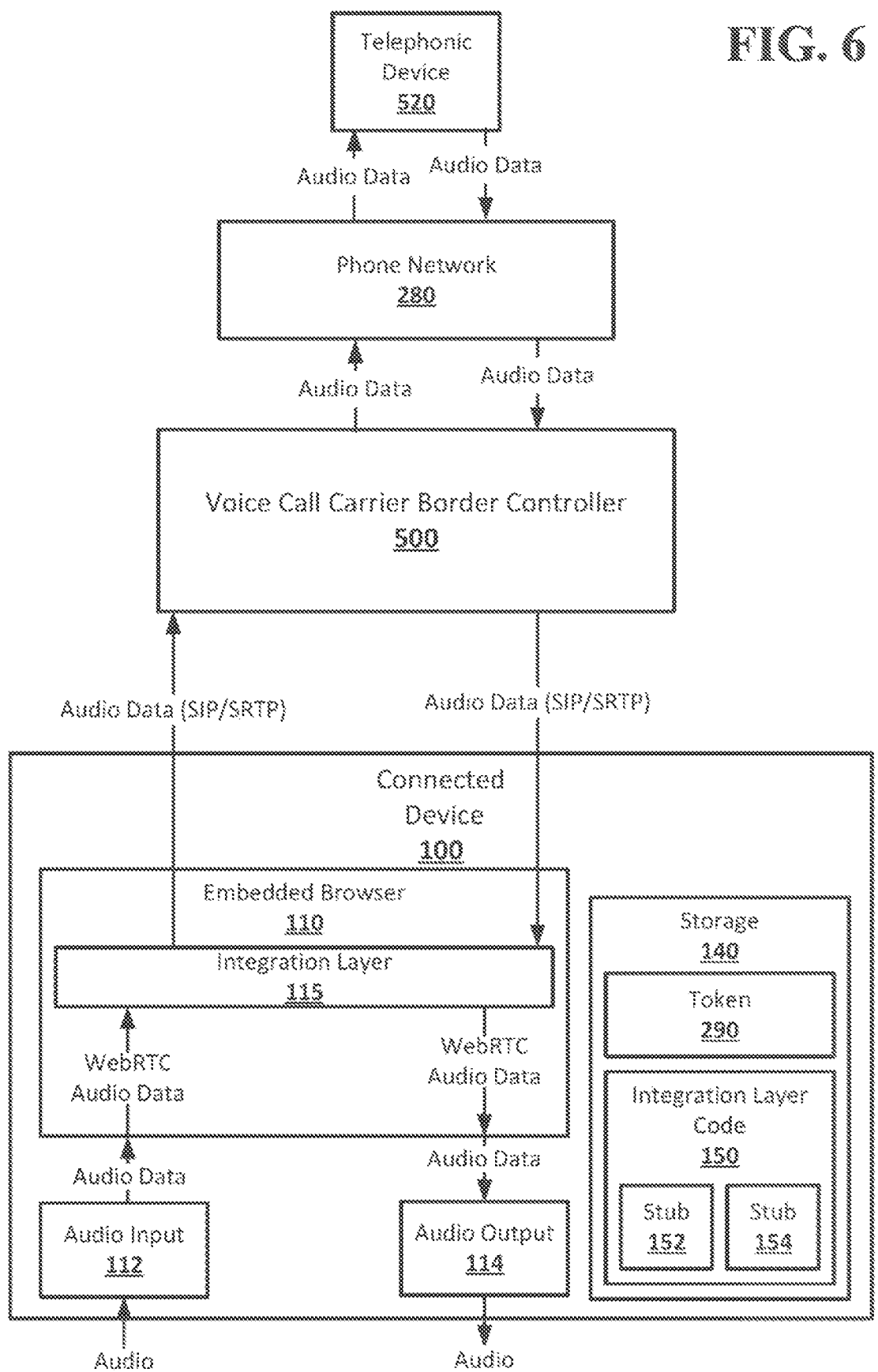
FIG. 6 shows an example arrangement suitable for voice calling with a connected device according to an implementation of the disclosed subject matter.

FIG. 6 shows an example arrangement suitable for voice calling with a connected device according, to an implementation of the disclosed subject matter. The user of the telephonic device 520 may accept the incoming call, resulting in a call being connected between the telephonic device 520 and the connected device 100. Audio from a user speaking may be received at the audio input 112. The audio input 112 may convert the audio to audio data, for example, digital audio data, that may be input to the embedded browser 110. The audio data input to the embedded browser 110 may be received by the embedded browser 110 as WebRTC audio data that may be part of an audio stream using WebRTC. The embedded browser 110 may handle audio data according to WebRTC natively, for example, using components of the embedded browser 110 written in the low-level programming language. The WebRTC audio data may be input to the integration layer 115, which may run within the embedded browser 110. The integration layer 115 may convert the WebRTC audio data into audio data that may be transmitted according to SRTP over a connection established with SIP. The audio data from the integration layer 115 may be sent to the voice call carrier border controller 500. The voice call carrier border controller 500 may route the audio data in any suitable systems of the voice call carrier, which may route the audio data over the phone network 280 to the telephonic device 520 in any suitable format.

Audio data from the telephonic device 520, for example, from a user of the telephonic device 520 speaking into a microphone of the telephonic device 520, may be routed through the phone network 280 back to the systems of the voice call carrier in any suitable manner. The voice call carrier border controller may send audio data from the telephonic device 520 to the connected device 100 over the connection established with SIP as audio data according to SRTP. The audio data according to SRTP may arrive at the integration layer 115 of the embedded browser 110, which may convert the audio data so that it may be transmitted using WebRTC. The WebRTC audio data may be part of the audio stream using WebRTC, and may be passed to the embedded browser 110 from the integration layer 115. The embedded browser 115 may send audio data from the WebRTC audio data to the audio output 114, which may convert the audio data to audio.

Figure 7:
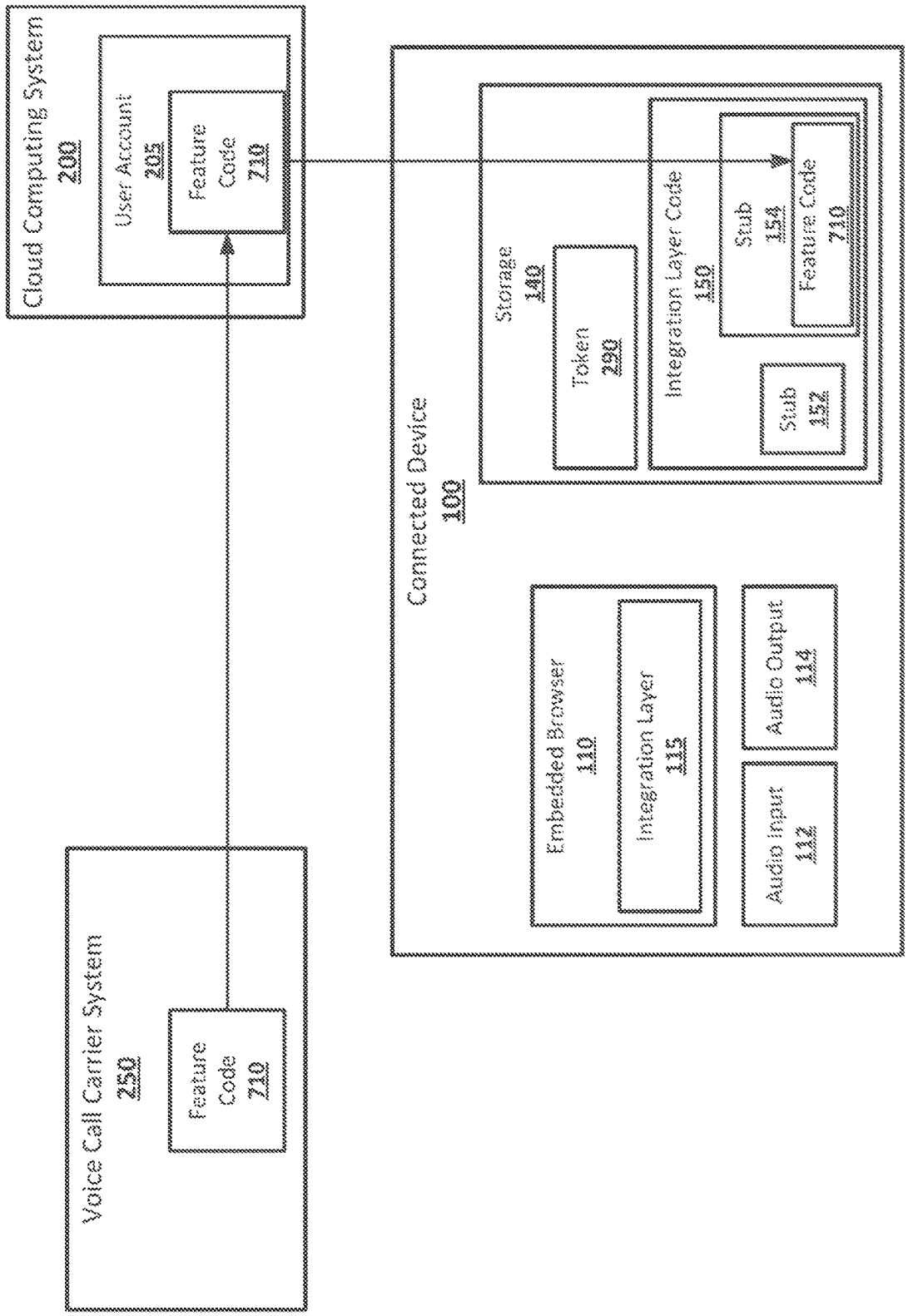
FIG. 7 shows an example arrangement suitable for voice calling with a connected device according to an implementation of the disclosed subject matter.

FIG. 7 shows an example arrangement suitable for voice calling with a connected device according to an implementation of the disclosed subject matter. A voice call carrier may add code to the integration layer 115 on the connected device 100 to implement additional features. The voice call carrier may prepare feature code 710, which may be code to implement a feature of the voice call carrier, such as, for example, call transfer, and may be written in the same programming language as the integration layer 115. The feature code 115 may be downloaded to the connected device 100, for example, from the voice call earner system 250 through the cloud computing system 200 and user account 205.

The feature code 710 may be added to the stub 154, which may be, for example, a stub in the integration layer 115 for a call transfer feature. The stub 154 may be a section of code that may be called by other code in the integration layer 115 when a call transfer command is received, for example, through a voice command from a user. The stub 154 may initially be empty, or may contain some basic code for the cdi transfer feature that may be universal to the implementation of call transfer across voice call carriers. The feature code 710 may include code that implements the call transfer feature for the voice call carrier of the voice call carrier system 250. For example, the feature code 710 may include a star code that, when received at the system of the voice call carrier through the voice call carrier border controller 500, may initiate a call transfer by the systems of the voice call carter to a phone number received along with, or after, the star code.

The feature code 710 may run as part of the integration layer 115, for example, being retrieved from the storage 140 when the integration layer 115 is run on the embedded browser 110, or when the stub 154 is called from elsewhere in the integration layer 115. The integration layer 115 may call the stub 154 when a call transfer command is received, resulting in the feature code 710 running as part of the integration layer 115 in the embedded browser 110 and initiating a call transfer. For example, a voice command invoking the feature of the feature code 710 may be received at the audio input 112 and converted to audio data. The connected device 100 may send audio data for the voice command invoking the feature of the feature code 710 to the cloud computing system 200, which may determine that the audio data voice command indicates the feature of the feature code 710, and may send this indication back to the connected device 100. The integration layer 115 may receive the indication that the voice command invoked the feature of the feature axle 710, and may call the stub 154, resulting in the running of the feature code 710 in the embedded browser 110. Items of data, such as star codes associated with the feature, or phone numbers to be used with the feature, may be sent from the connected device 100 to the voice call carrier border controller 500 based on the running on the feature code 710.

The feature code 710 may be removed, replaced, or updated, for example, by the voice call carrier that prepared the feature code 710, or by another voice call carrier if the user switches which voice call carrier the connected device 100 uses to make calls. The integration layer 115 may include any number of stubs for any number of features, such as, for example, call return, call forwarding, busy redial, and priority calling.

Figure 8:
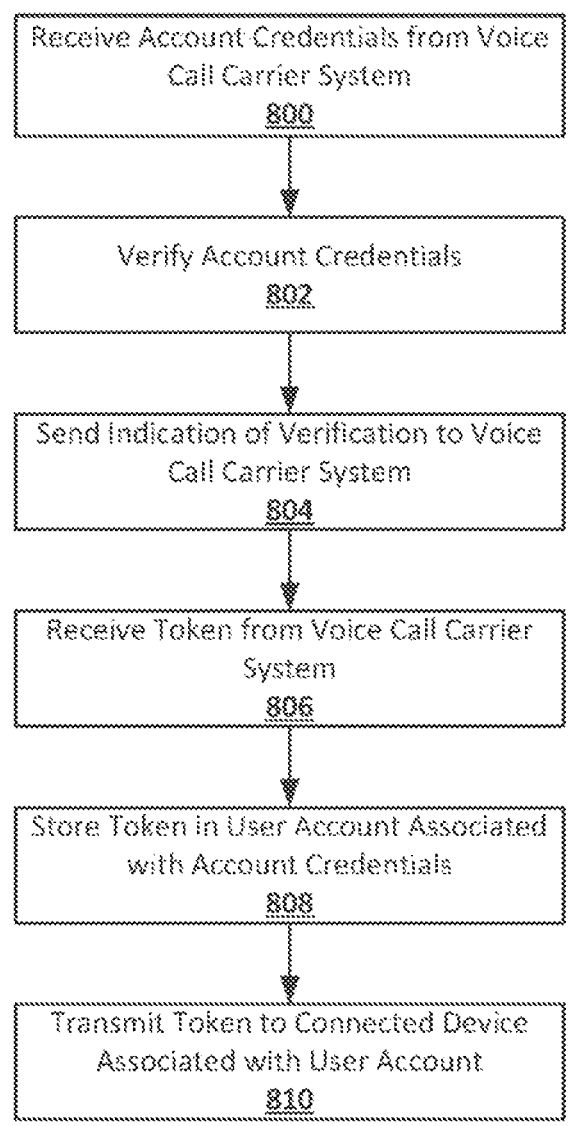
FIG. 8 shows an example of a process suitable for voice calling with a connected device according to an implementation of the disclosed subject matter.

FIG. 8 shows an example of a process suitable for voice calling with a connected device according to an implementation of the disclosed subject matter. At 800, account credentials may be received from a voice call carrier system. For example, the cloud computing system 200 may receive cloud computing account credentials from the voice call carrier system 250. The voice call carrier system 250 may have received the cloud computing account credentials from the user device 260 along with a phone number that is associated with the user account 255 on the voice call carrier system 250.

At 802, account credentials may be verified. For example, the cloud computing account credentials received at the cloud computing system 200 may indicate that they belong to the user account 205, for example, through a username or other identifier. The cloud computing system 200 may verify that tire cloud computing account credentials are the appropriate credentials for the user account 205, for example, include the appropriate password, password hash, or other such credential that allows access to the user account 205.

At 804, an indication of the verification may be sent to the voice call carrier system. For example, if the cloud computing system 200 successfully verified the cloud computing account credentials as belonging to the user account 205, the cloud computing system 200 may send an indication that the verification was successful back to the voice call carrier system 200.

At 806, a token may be received. For example, the cloud computing system 200 may receive a private token, such as the token 290, generated by the token generator 257 of the voice call carrier system 250. The token 290 may be generated based on the user account 255, including the phone number associated with the user account 255, and may be, for example, an OAuth token that may permit access to APIs of various systems of the voice call carrier, including the voice call carrier system 250.

At 808, the token may be stored in a user account associated with the account credentials. For example, the cloud computing system 200 may store the token 290 received from the voice call carrier system 250 as part of the user account 205. This may allow the token 290 to be transmitted to any device, such as the connected device 100, that may log-in to the user account 205.

At 810, the token may be transmitted to a connected device associated with the user account. For example, the token 290 may be transmitted from the cloud computing system 200 to the connected device 100 when the connected device 100 is logged-in to the user account 205. The token 290 may be stored in the storage 140 of the connected device 100.

Figure 9:
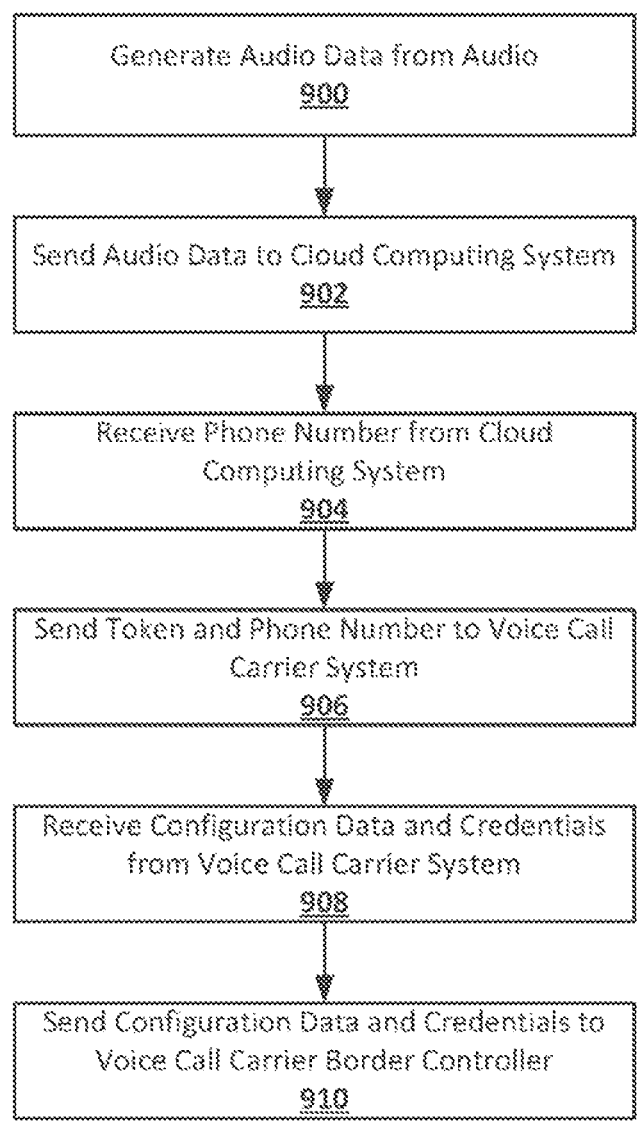
FIG. 9 shows an example of a process suitable for voice calling with a connected device according to an implementation of the disclosed subject matter.

FIG. 9 shows an example of a process suitable for voice calling with a connected device according to an implementation of the disclosed subject matter. At 900, audio data may be generated from audio. For example, audio for a voice command may be received at the audio input 112, which may include a microphone. The audio input 112 may convert the audio for the voice command to audio data, for example, digital audio data. The voice command may be, for example, a command to place a call to a specified party.

At 902, audio data may be sent to a cloud computing system. For example, the audio data generated by the audio input 112 may be passed to the embedded browser 110, which may determine that the audio data includes a command for the connected device 100. For example, audio data may include a keyword that indicates that the audio data includes a command for the connected device 100. The embedded browser 110 may send the audio data to the cloud computing system 200, for example, through the user account 205, using any suitable wired or wireless connection of the connected device 100.

At 904, a phone number may be received from the cloud computing system. For example, the cloud computing system 200 may determine the phone number for the specified party from the voice command based on the audio data received from the connected device 100 and the contact list 320 in the user account 205. The phone number for the specified party from the voice command may be sent back to the connected device 100, for example, to the embedded browser 110.

At 006, a token and phone number may be sent to a voice call carrier system. For example, the embedded browser 110 of the connected device 100 may retrieve the token 200 from the storage 140, and may send the token 290 and the phone number of the specified party to the voice call carrier system 250. The token 290 may allow the embedded browser 110 to call APIs of the voice call carrier system 250, for example, to generate the appropriate configuration data and credentials to place a call to the specified number using the user account 255 with the voice call carrier.

At 908, configuration data and credentials may be received from a voice call carrier system. For example, the embedded browser 110 of the connected device 100 may receive configuration data and credentials from the voice call carrier system 250. The configuration data and credentials may be based on the token 290 and phone number sent to the voice call carrier system 250 by the connected device 100.

At 910, configuration data and credentials may be sent to a voice call carrier border controller. For example, the embedded browser 110 of the connected device 100 may send the configuration data and credentials to the voice call carrier border controller 500 using any suitable wired or wireless network connection of the connected device 100. The configuration data and credentials may cause the voice call earner to place a call to the phone number of the specified party using the user account 255. The call may ring at a device reached as the phone number of the specified party, for example, the telephonic device 520, and at the connected device 100. The configuration data and credentials may allow a call to be placed by the connected device 100 using the user account 255 without the connected device 100 needing a SIM card cellular radio, or a phone line connecting the connected device 100 to the publicly switched telephone network.

Figure 10:
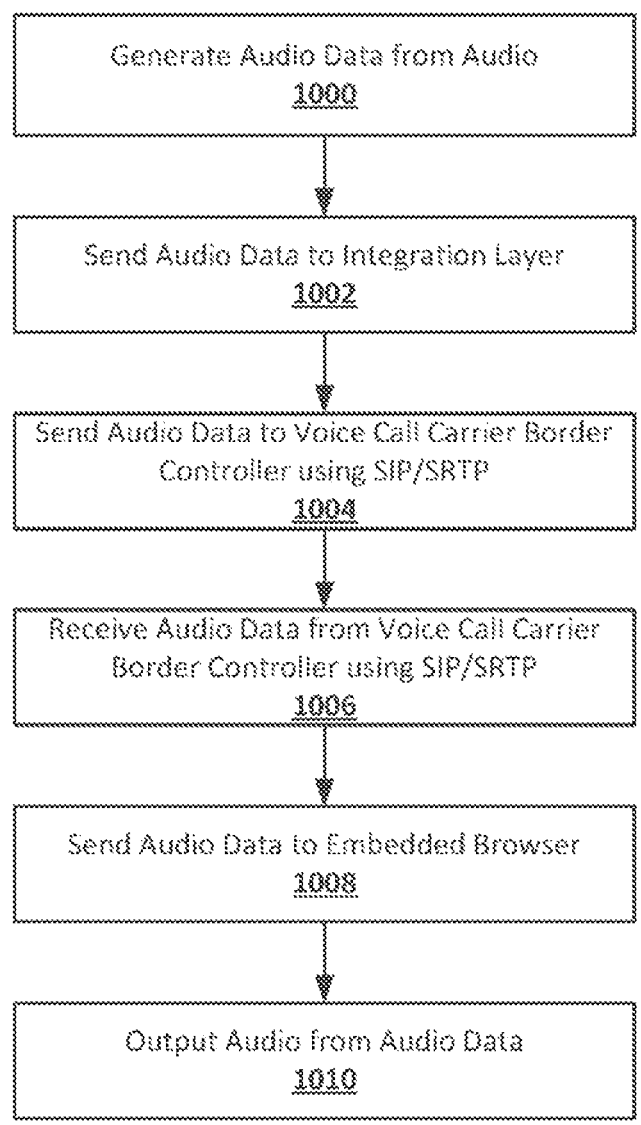
FIG. 10 shows an example of a process suitable for voice calling with a connected device according to an implementation of the disclosed subject matter.

FIG. 10 shows an example of a process suitable for voice calling with a connected device according to an implementation of the disclosed subject matter. At 1000, audio data may be generated from audio. For example, after a call is connected between the connected device 100 and the telephonic device 520, a user of the connected device 100 may begin speaking. Audio from the user may be received at the audio input 112, which may include a microphone. The audio input 112 may convert the audio to audio data, for example, digital audio data.

At 1002, audio data may be sent to an integration layer using WebRTC. For example, the audio data from the audio input 112 may be handled by the embedded browser 110 using WebRTC. The audio data may be input, using WebRTC, to the integration layer 115 of the embedded browser 110 by the components of the embedded browser 110 that handles WebRTC The integration layer 115 may run within the embedded browser 110, and may receive the audio data according to WebRTC from the components of the embedded browser 110 that handle audio data according to WebRTC natively.

At 1004, audio data may be sent to a voice call carrier border controller using SIP/SRTP. For example, the integration layer 115 may prepare the audio data received from the embedded browser using WebRTC to be transmitted to the voice call carrier border controller 500 over a connection established with SIP. The integration layer 115 may convert the audio data into any suitable format for sending according to SRTP. The audio data may be sent according to SRTP over any suitable wired or wireless network connection of the connected device 100 from the integration layer 115 to the voice call carrier border controller 500 over a SIP connection between the connected device 100 and the voice call carrier border controller 500. The voice call carrier border controller 500 may route the audio data through the phone network 280 to the telephonic device 520.

At 1006, audio data may be received from the voice call carrier border controller. For example, audio data originating at the telephonic device 520 may be arrive at the voice call carrier border controller 500 through the phone network 280. The audio data may be received at the integration layer 115 of the embedded browser 110 on the connected device 100 through the SIP connection. The audio data may be received according to SRTP.

At 1008, audio data may be sent out of the integration layer using WebRTC For example, the audio data received at the integration layer 115 from the voice call carrier border controller 500 may have been sent according to SRTP. The integration layer 115 may convert the audio data to be sent using WebRTC, and may output the audio data to the embedded browser 110 using WebRTC.

At 1010, audio may be output. For example, the embedded browser 110 may send the audio data received from the integration layer 115 according to WebRTC to the audio output 114. The audio output 114 may output audio based on the audio data, for example, through a speaker built-in to the connected device 100, or through a speaker connected to the connected device 100 through any suitable wired or wireless connection, including speakers connected using audio cables of any suitable type, speakers connected using WiFi, or speakers connected using Bluetooth.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or tut acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 11:
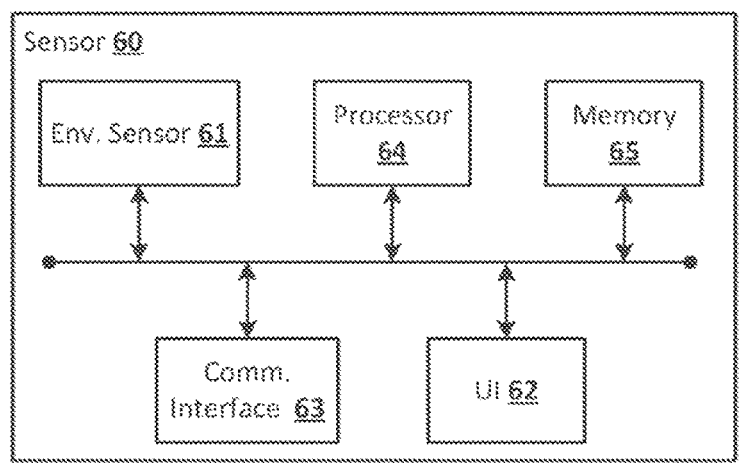
FIG. 11 shows a computing device according to an embodiment of the disclosed subject matter.

A sensor may include hardware in addition to the specific physical sensor that obtains information about the environment FIG. 11 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose, for example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 12:
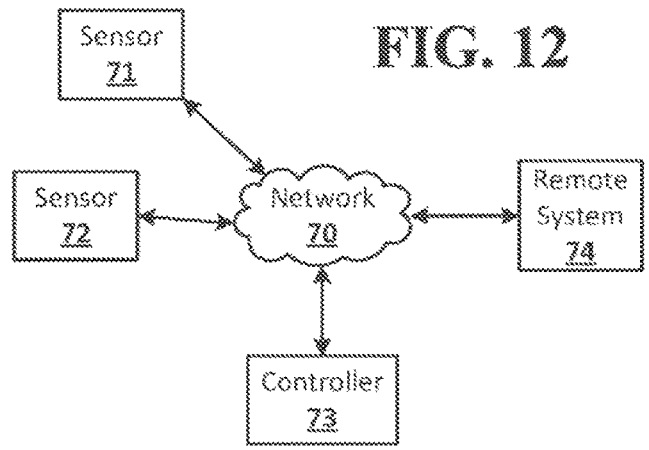
FIG. 12 shows a system according to an embodiment of the disclosed subject matter.

FIG. 12 shows an example of a sensor network as disclosed herein, which may be implemented over any suitable wired and/or wireless communication networks One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the connected device 100 may be an example of a controller 73 and the sensors 210 may be examples of sensors 71 and 72, as shown and described in further detail with respect to FIGS. 1-10.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network, overhead and latency. The communication interfaces of the devices coupled to the smart-home environment may include wireless system-on-chips to support the low-power, secure, stable, and/or scalable communications network 70.

The sensor network shown in FIG. 12 may be an example of a smart-home environment. The depicted smart-home environment may include a structure, a house, office building, garage, mobile home, or the like. The devices of the smart environment, such as the sensors 71, 72, the controller 73, and the network 70 may be integrated into a smart-home environment that does not include an entire structure, such as an apartment, condominium, or office space.

The smart environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling Devices of the smart-home environment, such as the sensors 71, 72, may be mounted on, integrated with and/or supported by a wall, floor, or ceiling of the structure.

The smart-home environment including the sensor network shown in FIG. 12 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entry way interface devices (e.g., "smart doorbells"). The smart hazard detectors, smart thermostats, and smart doorbells may be the sensors 71, 72 shown in FIG. 12.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 12, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 12, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 12 may include one or more intelligent, multi sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 12. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 12 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entry ways, and the like are closed and/or that all smart entry detectors are armed.

The smart-home environment of the sensor network shown in FIG. 12 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 12 can be communicatively coupled to each other via tire network 70, and to the controller 73 and/or remote system 74 to provide security, safety, and/or comfort for the smart environment).

A user can interact with one or more of the network-connected connected devices (e.g., via the network 70). For example, a user can communicate with one or more of the network-connected connected devices using a computer (e.g., a desktop computer, laptop computer, tablet, or the like) or other portable electronic device (e.g., a smartphone, a tablet, a key FOB, and the like) A webpage or application can be configured to receive communications from the user and control the one or more of the network-connected connected devices based on the communications and/or to present information about the device's operation to the user. For example, the user can view can arm or disarm the security system of the home.

One or more users can control one or more of the network-connected connected devices in the smart home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected connected devices and the security system of the smart-home environment. A user can use their registered electronic device to remotely control the network-connected connected devices and security system of the smart-home environment, such as when the occupant is at work or on vacation. The user may also use their registered electronic device to control the network-connected connected devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected connected devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected connected devices in the smart-home environment. For example, in the event, any of the network-connected connected devices, such as smart wall plugs located outdoors, detect movement at night time, the controller 73 and/or remote system 74 can activate the outdoor lighting system and/or other lights in the smart-home environment.

Figure 13:
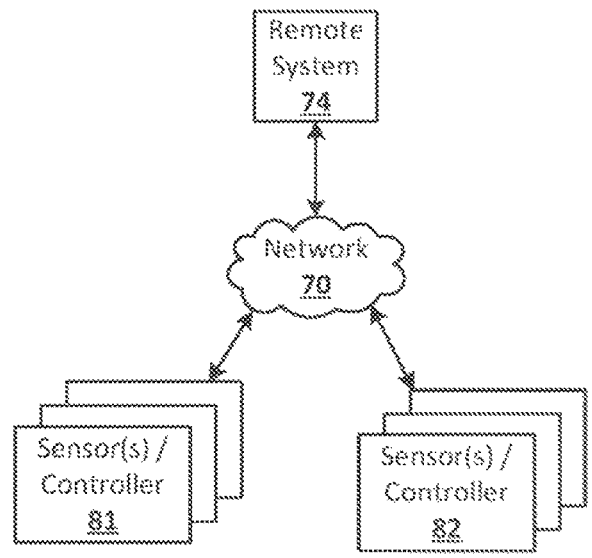
FIG. 13 shows a system according loan embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 13 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate, and analyze the data from multiple locations, and may provide aggregate results to each location. For example, the remote system 74 may examine larger regions tor common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 14:
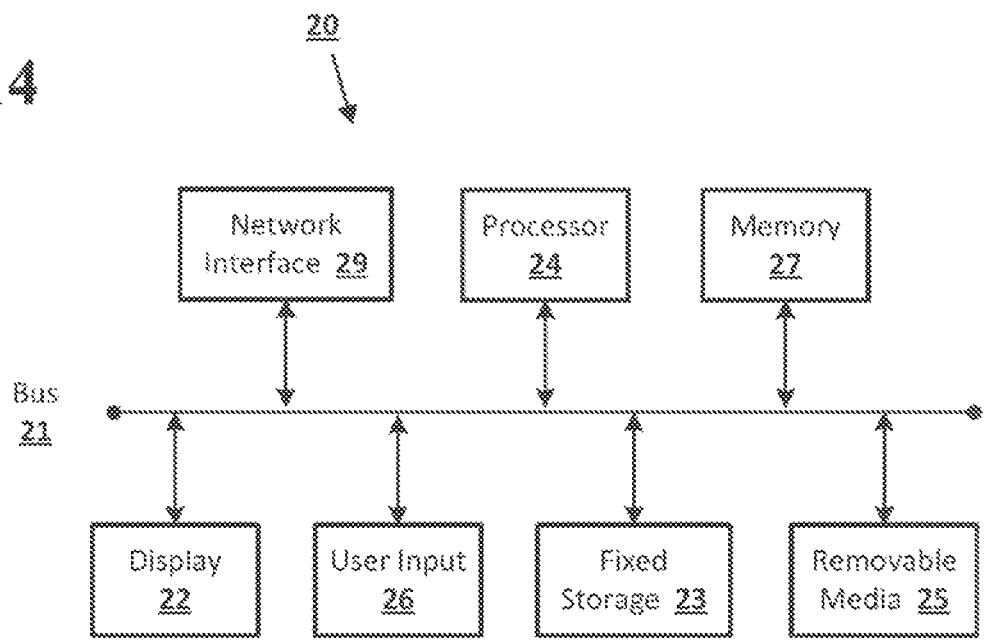
FIG. 14 shows a computer according to an embodiment of the disclosed subject matter.

Embodiments of the presently disclosed subject matter may be implemented in and used with a variety of computing devices. FIG. 14 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(R), near-field, and the like. For example, the network inter face 29 may allow the device to communicate with other computers via one or more local, wide-area, or other communication networks, as described in further detail herein.

Figure 15:
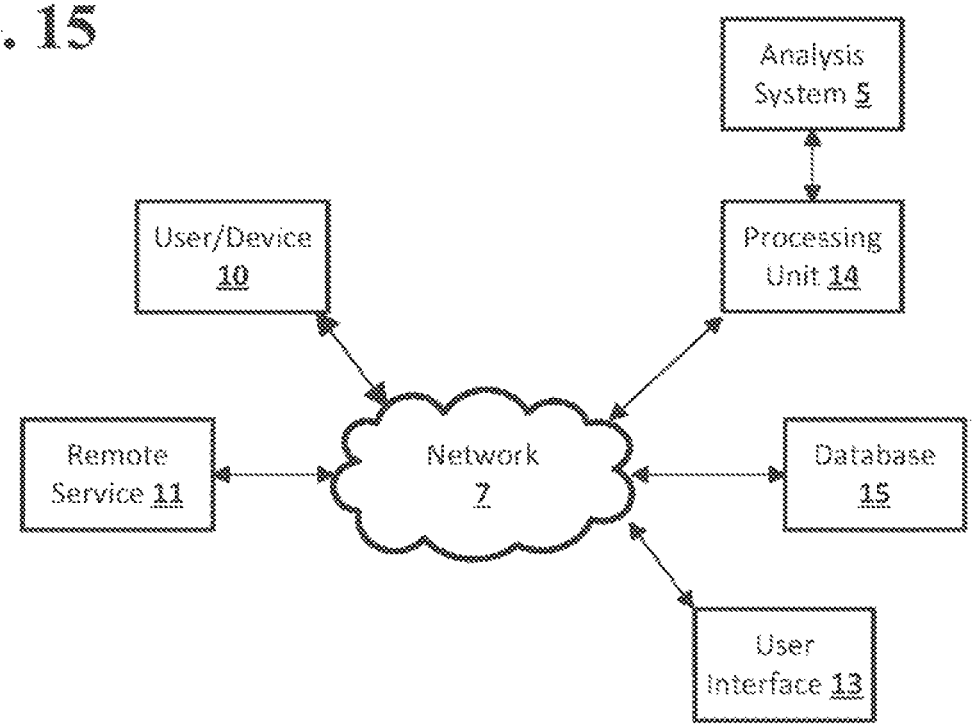
FIG. 15 shows a network configuration according to an embodiment of the disclosed subject matter.

FIG. 15 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or w ireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, pan of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of staring electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
    receiving outgoing audio data from an audio input of a connected device at an embedded browser running on the connected device, wherein the connected device comprises none of a SIM card slot, eSIM electronics, and a telephone port;
    sending the outgoing audio data from the embedded browser to an integration layer running within the embedded browser, wherein the outgoing audio data is sent using Web Real Time Communications (WebRTC);
    sending the outgoing audio data from the integration layer to a border controller for a voice call carrier over a Session Initiation Protocol (SIP) connection, wherein the outgoing audio data is sent according to Secure Real Time Transport Protocol (SRTP);
    receiving incoming audio data at the integration layer from the border controller for the voice call carrier over the SIP connection, wherein the incoming audio data is received according to the SRTP;
    sending the incoming audio data from the integration layer to the embedded browser, wherein the incoming audio data is sent using the WebRTC;
    sending the incoming audio data from the embedded browser to an audio output of the connected device; and
    outputting, by the audio output of the connected device, audio based on the incoming audio data.

2. The computer-implemented method of claim 1, wherein the SIP connection is established by:
    sending, to a voice call carrier system, a private token and a phone number of a specified party, wherein the private token is associated with a user account on the voice call carrier system;
    receiving, from the voice call carrier system, configuration data and credentials, wherein the configuration data comprises the phone number of the specified party; and
    sending, to the border controller for the voice call carrier, the configuration data and credentials.

3. The computer-implemented method of claim 2, wherein the private token is obtained from the voice call carrier system based on sending the voice call carrier system credentials for a cloud computing account and a phone number associated with the user account on the voice call carrier system and sending a verification code sent by the voice call carrier system to a telephonic device using the phone number associated with the user account on the voice call carrier system to the voice call carrier system, and further comprising:
    receiving the private token from the voice call carrier system or a cloud computing system that comprises the cloud computing account; and
    storing the private token.

4. The computer-implemented method of claim 1, further comprising:
    receiving, at the audio input, audio for a voice command to place a call and converting the audio to audio data for the voice command to place the call;
    sending the audio data for the voice command to place the call to a cloud computing system comprising a user account associated with the connected device; and
    receiving a phone number for a specified party in the audio data for the voice command to place the call from the cloud computing system.

5. The computer-implemented of claim 1, wherein the embedded browser is written in C++ and the integration layer is written in JavaScript.

6. The computer-implemented method of claim 1, further comprising:
    receiving, at the connected device from a cloud computing system or a voice call carrier system, feature code for a feature, wherein the feature is associated with phone calling; and
    storing the feature code in a stub of the integration layer, wherein the stub is associated with the feature.

7. The computer-implemented method of claim 6, wherein the feature code is written in a same programming language as the integration layer and includes at least one star code associated with systems of the voice call carrier.

8. The computer-implemented method of claim 6, further comprising:
    receiving, at the audio input, audio for a voice command invoking the feature and converting the audio to audio data for the voice command invoking the feature;
    sending the audio data for the voice command invoking the feature to the cloud computing system comprising a user account associated with the connected device;
    receiving an indication of the feature in the audio data for the voice command invoking the feature from the cloud computing system;
    running, in the embedded browser, the feature code for the feature from the stub in the integration layer; and
    sending, from the integration layer, at least one item of data for the feature to the border controller of the voice call carrier based on the running of the feature code.

9. The computer-implemented method of claim 1, wherein the connected device is a smart speaker or a smart display.

10. A computer-implemented system for voice calling with a connected device comprising:
    an audio input configured to receive audio and convert the audio to outgoing audio data;
    an audio output configured to receive incoming audio data and convert the incoming audio data to audio;
    a storage; and
    a processor configured to receive the outgoing audio data from the audio input at an embedded browser running on the connected device, send the outgoing audio data from the embedded browser to an integration layer running within the embedded browser, wherein the outgoing audio data is sent using Web Real Time Communications (WebRTC), send the outgoing audio data from the integration layer to a border controller for a voice call carrier over a Session Initiation Protocol (SIP) connection, wherein the outgoing audio data is sent according to Secure Real Time Transport Protocol (SRTP), receive the incoming audio data at the integration layer from the border controller for the voice call carrier over the SIP connection, wherein the incoming audio data is received according to the SRTP, and send the incoming audio data from the integration layer to the embedded browser, wherein the incoming audio data is sent using the WebRTC, and send the incoming audio data from the embedded browser to the audio output, and wherein the connected device comprises none of a SIM card slot, eSIM electronics, and a telephone port.

11. The computer-implemented system of claim 10, wherein the processor is further configured to establish the SIP connection by sending, to a voice call carrier system, a private token and a phone number of a specified party, wherein the private token is associated with a user account on the voice call carrier system, receiving, from the voice call carrier system, configuration data and credentials, wherein the configuration data comprises the phone number of the specified party, and sending, to the border controller for the voice call carrier, the configuration data and credentials.

12. The computer-implemented system of claim 11, wherein the private token is obtained from the voice call carrier system based on sending the voice call carrier system credentials for a cloud computing account and a phone number associated with the user account on the voice call carrier system and sending a verification code sent by the voice call carrier system to a telephonic device using the phone number associated with the user account on the voice call carrier system to the voice call carrier system, and wherein the processor is further configured to receive the private token from the voice call carrier system or a cloud computing system that comprises the cloud computing account and store the private token in the storage.

13. The computer-implemented system of claim of claim 10, wherein the audio input is further configured to receive audio for a voice command to place a call and convert the audio for the voice command to place the call to audio data for the voice command to place the call, and wherein the processor is further configured send the audio data for the voice command to place the call to a cloud computing system comprising a user account associated with the connected device and receive a phone number for a specified party in the audio data for the voice command to place the call from the cloud computing system.

14. The computer-implemented system of claim 10, wherein the embedded browser is written in C++ and the integration layer is written in JavaScript.

15. The computer-implemented system of claim 10, wherein the processor is further configured to receive, from a cloud computing system or a voice call carrier system, feature code for a feature, wherein the feature is associated with phone calling, and—store the feature code in a stub of the integration layer, wherein the stub is associated with the feature.

16. The computer-implemented system of claim 15, wherein the feature code is written in the same programming language as the integration layer and includes at least one star code associated with systems of the voice call carrier.

17. The computer-implemented system of claim 15, wherein the audio input is further configured to receive audio for a voice command invoking the feature and convert the audio for the voice command invoking the feature to audio data for the voice command invoking the feature, and wherein the processor is further configured to send the audio data for the voice command invoking the feature to the cloud computing system comprising a user account associated with the connected device, receive an indication of the feature in the audio data for the voice command invoking the feature from the cloud computing system, run, in the embedded browser, the feature code for the feature from the stub in the integration layer, and send, from the integration layer, at least one item of data for the feature to the border controller of the voice call carrier based on the running of the feature code.

18. The computer-implemented system of claim 10, wherein the connected device is a smart speaker or a smart display.

19. A system comprising: one or more computers and one or more storage devices storing instructions which are operable, when executed by the one or more computers, to cause the one or more computers to perform operations comprising:

receiving outgoing audio data from an audio input of a connected device at an embedded browser running on the connected device, wherein the connected device comprises none of a SIM card slot, eSIM electronics, and a telephone port;

sending the outgoing audio data from the embedded browser to an integration layer running within the embedded browser, wherein the outgoing audio data is sent using Web Real Time Communications (WebRTC);

sending the outgoing audio data from the integration layer to a border controller for a voice call carrier over a Session Initiation Protocol (SIP) connection, wherein the outgoing audio data is sent according to Secure Real Time Transport Protocol (SRTP);

receiving incoming audio data at the integration layer from the border controller for the voice call carrier over the SIP connection, wherein the incoming audio data is received according to the SRTP;

sending the incoming audio data from the integration layer to the embedded browser, wherein the incoming audio data is sent using the WebRTC;

sending the incoming audio data from the embedded browser to an audio output of the connected device; and outputting, by the audio output of the connected device, audio based on the incoming audio data.

20. The system of claim 19, wherein the instructions further cause the one or more computers to perform operations to establish the SIP connection comprising:

sending, to a voice call carrier system, a private token and a phone number of a specified party, wherein the private token is associated with a user account on the voice call carrier system;

receiving, from the voice call carrier system, configuration data and credentials, wherein the configuration data comprises the phone number of the specified party; and sending, to the border controller of the voice call carrier, the configuration data and credentials.

* * * * *